United States Patent
Sorotokin et al.

(10) Patent No.: US 8,707,404 B2
(45) Date of Patent: Apr. 22, 2014

(54) SYSTEM AND METHOD FOR TRANSPARENTLY AUTHENTICATING A USER TO A DIGITAL RIGHTS MANAGEMENT ENTITY

(75) Inventors: Peter Sorotokin, Cupertino, CA (US); James L. Lester, Dublin, CA (US); Sunil C. Agrawal, Milpitas, CA (US); Andrei Sheretov, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 475 days.

(21) Appl. No.: 12/550,265

(22) Filed: Aug. 28, 2009

(65) Prior Publication Data

US 2013/0125223 A1    May 16, 2013

(51) Int. Cl.
*H04L 9/32* (2006.01)
*H04L 29/06* (2006.01)

(52) U.S. Cl.
CPC ........... *H04L 9/3213* (2013.01); *H04L 63/0807* (2013.01); *H04L 2209/603* (2013.01); *H04L 2463/101* (2013.01)
USPC .................................. 726/6; 726/7; 713/155

(58) Field of Classification Search
CPC ..... H04L 9/3213; H04L 63/0807; H04L 9/32; H04L 2209/603; H04L 2463/101
USPC .................................................... 726/2, 6–7
See application file for complete search history.

(56) References Cited

U.S. PATENT DOCUMENTS

| 5,910,987 | A | 6/1999 | Ginter | |
|---|---|---|---|---|
| 7,194,764 | B2 | 3/2007 | Martherus | |
| 2006/0070124 | A1 | 3/2006 | Arndt | |
| 2007/0226811 | A1 | 9/2007 | Kamperman | |
| 2008/0066185 | A1* | 3/2008 | Lester et al. | 726/27 |
| 2009/0271847 | A1* | 10/2009 | Karjala et al. | 726/6 |
| 2010/0100925 | A1* | 4/2010 | Hinton | 726/1 |

* cited by examiner

*Primary Examiner* — Jung Kim
*Assistant Examiner* — Ayoub Alata
(74) *Attorney, Agent, or Firm* — Finch & Maloney PLLC

(57) ABSTRACT

Various embodiments of a system and method for transparently authenticating a user to a digital rights management entity are described. In various embodiments, a digital rights management server may be configured to receive an authentication token from a first remote computer system. Such authentication token may indicate that a particular user of the first remote computer system was authenticated by a first content provider of one or more content providers. In various embodiments, the digital rights management server may also be configured to verify the authentication token by determining that one or more portions of the authentication token were generated based on respective authentication information issued to the first content provider. In various embodiments, the digital rights management server may also be configured to, in response to verification of the authentication token, issue to the first remote computer system one or more credentials.

10 Claims, 8 Drawing Sheets

--- receiving an authentication token from a first remote computer system, the authentication token indicating that a particular user of the first remote computer system was authenticated by a first content provider of one or more content providers
702

↓ verifying the authentication token, including determining that one or more portions of the authentication token were generated based on respective authentication information issued to the first content provider
704

↓ in response to verification of the authentication token, issuing to the first remote computer system one or more credentials for performing one or more of: communication with the one or more content providers, and decryption of content received from the one or more content providers
706 receiving an authentication token from a first remote computer system, the authentication token indicating that a particular user of the first remote computer system was authenticated by a first content provider of one or more content providers
702 verifying the authentication token, including determining that one or more portions of the authentication token were generated based on respective authentication information issued to the first content provider
704 in response to verification of the authentication token, issuing to the first remote computer system one or more credentials for performing one or more of: communication with the one or more content providers, and decryption of content received from the one or more content providers
706

*FIG. 7* receiving an authentication token from a first content provider of one or more content providers, the authentication token indicating a particular user was authenticated by the first content provider
802 providing the authentication token to a digital rights management provider
804 subsequent to the digital rights management provider verifying the authentication token, receiving from the digital rights management provider one or more credentials for performing one or more of: communication with said one or more content providers, and decryption of content received from said one or more content providers
806

*FIG. 8*

SYSTEM AND METHOD FOR TRANSPARENTLY AUTHENTICATING A USER TO A DIGITAL RIGHTS MANAGEMENT ENTITY

BACKGROUND

1. Field of the Invention

The present invention is directed to computer systems and other electronic devices. More particularly, it is directed to digital rights management within such an environment.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining content. For example, a user might log on to a music retailer's website and download a digital version of a music album. In another example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized entities and/or controlling the manner in which entities access electronic content.

In some cases, DRM techniques designed to prevent unauthorized access to content may require legitimate users to engage in additional activities not normally present in a DRM-free framework. To some users, particularly the uninitiated, these additional activities may detract from the overall customer experience and may even appear to be confusing or superfluous. While merchants of valuable content may generally desire to minimize theft and misuse of such content, such merchants may carefully consider the implications to customer satisfaction when choosing how to implement a DRM framework.

SUMMARY

Various embodiments of a system and method for transparently authenticating a user to a digital rights management entity are described. In various embodiments, a digital rights management server may be configured to receive an authentication token from a first remote computer system. Such authentication token may indicate that a particular user of the first remote computer system was authenticated by a first content provider of one or more content providers. In various embodiments, the digital rights management server may also be configured to verify the authentication token by determining that one or more portions of the authentication token were generated based on respective authentication information issued to the first content provider. In various embodiments, the digital rights management server may also be configured to, in response to verification of the authentication token, issue to the first remote computer system one or more credentials. In various embodiments, the content issued by the content provider may contain information to identify both the content provider and user (or the content consumption component accessible to the user). In this way, the user's system may in various embodiments contact the content provider system and provide appropriate information to authenticate and receive an authentication token in return.

BRIEF DESCRIPTION OF THE DRAWINGS

FIG. 7 illustrates a flowchart of an example method for processing an authentication token and activating a client device, according to some embodiments.

FIG. 8 illustrates a flowchart of an example method for providing an authentication token to a DRM provider as well as the receipt of credential from such DRM provider, according to some embodiments.

Figure 1:
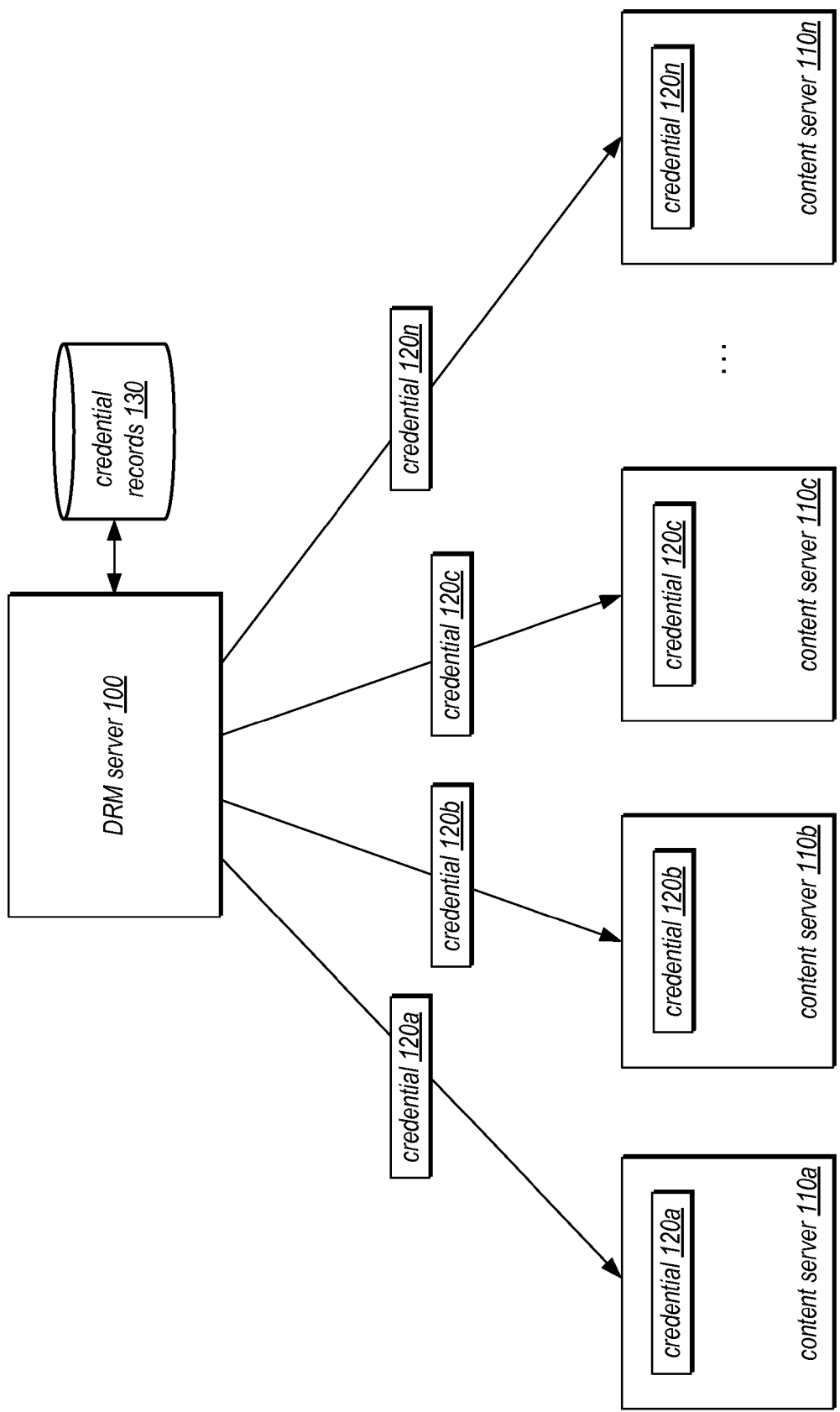
FIG. 1 illustrates a flow diagram of a DRM server establishing a trust relationship with multiple content servers, according to some embodiments.

While the system and method for transparently authenticating a user to a digital rights management entity is described herein by way of example for several embodiments and illustrative drawings, those skilled in the art will recognize that the system and method for transparently authenticating a user to a digital rights management entity is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for transparently authenticating a user to a digital rights management entity as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for transparently authenticating a user to a digital rights management entity are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various portions of this detailed description may refer to "client(s)" and "server(s)" or similar terminology. For instance, various embodiments may include (among other elements) a client system or client device (or simply a "client") and/or one or more server systems (or simply "servers") (e.g., license servers). It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "digital content," "content item(s)," "content data," "content information" or simply "data" or "information"). In some embodiments, content may include any information or data that may be licensed to one or more individuals (or other entities, such as business or group). In one particular example, content may include an electronic book (or "e-book"), which may includes electronic representations of a physical book (e.g., short stories, novels, essays, magazines, etc.). Examples of e-books include but are not limited to text-based files adhering to the Portable Document Format (.PDF) as well as the Electronic Publication (.EPUB) format created by the International Digital Publishing Forum (IDPF). In various embodiments, content may include electronic representations of video, audio, text and/or graphics, which may include but is not limited to electronic representations of videos, movies, or other multimedia, which may include but is not limited to data files adhering to Adobe® Flash® Video (.FLV or .F4V) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: PDF, EPUB, JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various instances, this detailed disclosure may refer to consuming content or to the consumption of content, which may include accessing content, rendering content, displaying content, playing content, presenting content, and generating, storing or accessing an unencrypted version of content, among other things. In some cases, consuming content may include generating a human-perceptible version of the content (e.g., presenting or displaying video on a display, generating audio through a transducer or speaker, etc) from a stored representation of content within memory of a computer system. In some cases, the particular term utilized to convey the consumption of content may be dependent on the context in which it is used. For example, consuming an e-book may also be referred to as presenting, viewing, displaying or even "reading" the e-book. In another example, consuming audio may also be referred to as listening to or playing the audio.

Note that in various instances the description presented herein may refer to a given entity (e.g., a content provider, a digital rights management provider, a user, a client, etc.) performing some action. It should be understood that this language may in some cases mean that a respective system (e.g., a computer system) or device owned and/or controlled by the given entity is actually performing the action.

Note that the description presented herein may include one or more references to a one-way function or a cryptographic hash function, either of which may be referred to herein as simply a hash function. In general, a hash function may operate on a block of data in order to return a fixed-size bit string (e.g., the hash value, or simply "hash") such that an accidental or intentional change to the block of data will result in a different hash value if the hash function is performed on that changed data (although variations thereof may be utilized in various embodiments). In some cases, the aforesaid block of data may be referred to as a "message" and the corresponding hash value may be referred to as the "message digest." In various embodiments, a hash function may include any function or set of operations operating as described above. Examples of hash functions include, but are not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions. In various embodiments, references to performing cryptographic hash functions may include generating a keyed-Hash Message Authentication Code (HMAC), such as HMAC-SHA1 or HMAC-MD5. Any of such hash functions may be utilized, e.g., the verification of digital signatures as described in more detail herein.

Various embodiments may include various encryption and/or decryption keys, any of which may be generated via a key derivation function (KDF). Some key derivation functions may include one or more iterations or instances of hash functions and/or other cryptographic operations in order to generate an encryption or decryption key. Examples of key derivation functions may include but are not limited to any key derivation functions specified by Public Key Cryptography Standards (PKCS) (e.g., PKCS-5) or Adobe® Password Security. In various embodiments, KDFs may be utilized by any of the various components described herein to generate encryption keys for symmetric encryption.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more iterations of cryptographic hash functions and/or one or more iterations of key generation functions. For symmetric encryption, references to a decryption key corresponding to an encryption key may mean that the decryption key is the same as the encryption key. For asymmetric encryption, references to a decryption key corresponding to an encryption key may mean that the decryption key is a private key and the encryption key is the public key that forms a public key-private key pair with the decryption key. References to encryption may include asymmetric encryption, symmetric encryption, another type of encryption, or some combination thereof.

Introduction

Embodiments of a system and method for transparently authenticating a user to a digital rights management entity are described. Various embodiments may include a DRM framework including one or more content providers, one or more content consumers as well as a DRM provider. In various embodiments, content providers may include any entity that sells, rents, leases, loans or otherwise distributes DRM-protected content. Content consumers may include users to which such content is sold, rented, leased, loaned or otherwise distributed. In some cases, content consumers may pay for access to DRM-protected content (e.g., a purchase of an e-book from a bookseller). In other cases, content consumers may rent DRM-content from a content provider (e.g., an electronic library book); such DRM-content may expire at the end of a specified time period (e.g., a 2-week rental period).

In various embodiments, content providers may rely on DRM providers to handle the management of a given user's content consumption devices (e.g., computer systems, mobile devices, e-book readers, etc.). For instance, content providers may rely on DRM providers to implement a DRM framework that enforces a limit on the particular quantity of devices on which a given user may consume content (e.g., five devices, or some other quantity of devices). In this way, the content provider may rest assured that a single user will not intentionally or unintentionally share their content with a large quantity of users that are not authorized to consume the content. For instance, the DRM framework may ensure that a student does not share copies of a single electronic textbook with an entire classroom of students. In various embodiments, to manage the content consumption components on which a given user may consume content, the DRM provider may activate or deactivate a given component by issuing credentials to that component or revoking credentials for that component, respectively.

In conventional DRM systems, a given content consumer (e.g., a user of a content consumption device) may be required to establish an account with a DRM provider in order to participate in the aforesaid DRM framework. For instance, the content consumer may be required to establish user credentials (e.g., a username and password) to be used for directly authenticating with the DRM provider. For example, in order to activate a component with which to consume content, a user may be required to perform authentication with the DRM provider. Once the user is authenticated, the DRM provider may proceed with component activation. In conventional systems, this may include a user providing authentication information (e.g., a username and password) to their content consumption device (e.g., a personal computer or mobile device), which then provides the authentication information to the DRM provider.

Various embodiments described herein provide for the transparent authentication of a content consumer to a DRM provider. As described in more detail herein, various embodiments may include a DRM provider establishing one or more trust relationships with one or more respective content providers. For a given trusted content provider, the existence of a trust relationship between that content provider and the DRM provider may be represented by digital credential issued to the content provider. As described in more detail below, this trust relationship may be utilized to enable a content provider to vouch for the identity of user. For instance, in various embodiments, if the content provider attests that a particular content consumer's identity has been authenticated, the DRM provider may accept this attestation as a positive authentication of the content consumer instead of requiring user-submitted authentication information (e.g., a username and password) from the content consumer. In this way, while the user may still authenticate to a content provider, the authentication of the user to the DRM provider may be transparent to the user in various embodiments. In such embodiments, such an implementation may prove to be a more convenient arrangement for the user, since the user himself is no long required to directly engage in a DRM authentication process separate from the authentication process performed with the content provider.

Establishing a Trust Relationship

FIG. 1 illustrates the establishment of a trust relationship between a DRM provider and one or more content providers, according to some embodiments. In the illustrated embodiments, DRM server 100 may be a computer system owned and/or controlled by the aforesaid DRM provider. Additionally, each content server 110a-110n (collectively referred to herein as content servers 110) may be a computer system owned and/or controlled by the aforesaid content providers. In some cases, different content servers may be operated by different content providers. For instance, content server 110a may be associated an e-commerce website that sells e-books and content server 110b may be associated with a public library that loans e-books to library card holders. In the illustrated embodiments, DRM server 100 may be configured to establish a trust relationship with any of the content servers. For instance, DRM server 100 may be configured to issue each content server a respective one of credentials 120a-120n (collectively referred to herein as credentials 120). In various embodiments, DRM server 100 may issue a credential to a respective content server in response to an authentication or registration process performed between the content provider and DRM provider. In some cases, such an authentication or registration process may occur directly between the DRM server and the content server. In other cases, some or all of such authentication or registration processes may occur offline, such as through communication between representatives of the respective entities.

In various embodiments, a given credential may include cryptographic information that may be used to certify information or data. For instance, content server 110a may be configured to create a message (e.g., information or data) and digitally sign such message with the credential such that the DRM server, upon receiving such message, may verify the authenticity of the message (e.g., verify that the message was created by the content server and/or verify that the message was not altered during transmission). In one example, a credential issued to a particular content server may include a public key-private key pair issued to that content server; in other cases a credential may include authentication information, such as shared secret or key for generating an authentication code (e.g., a MAC). To digitally sign a message, the content server may create a digital signature of that message using the private key of the key pair or it may create an authentication code from a private key (e.g., a MAC). Upon receipt of such digitally signed message, DRM server 100 may be configured to verify that digital signature with the public key that correspond to the private key used by the content server to create the digital signature. In other embodiments, credentials may be a shared secret such as a symmetric key. In these cases, the digital signature creation and verification may be similar to the public key case with the exception that the same key (e.g., the shared secret) is utilized to create the digital signature as well as verify the digital signature. In various embodiments, DRM server 100 may store credential records 130 that map identifiers of content servers to respective credentials. In this way, the DRM server may, upon receiving a message from a content server, lookup the appropriate credentials issued to that content server and verify the authenticity of the message with such credentials. As described in more detail with respect to later figures, the illustrated credentials may in various embodiments be utilized to create particular type of authentication token.

In the illustrated embodiment, DRM server 100 is the issuer of credentials 120. However, in various other embodiments, DRM server 100 may rely on one or more other entities to issue such credentials, such as one or more certificate authorities including but not limited to a certificate authority adhering to public key infrastructure (PKI). For instance, in an embodiment utilizing PKI, the DRM provider may serve as the registration authority that approves or disapproves requests from content providers (e.g., requests to be trusted by the DRM provider and/or participate in the DRM framework) and a certificate authority may perform the actual issuance of the credentials to the content providers.

Activation

Figure 2:
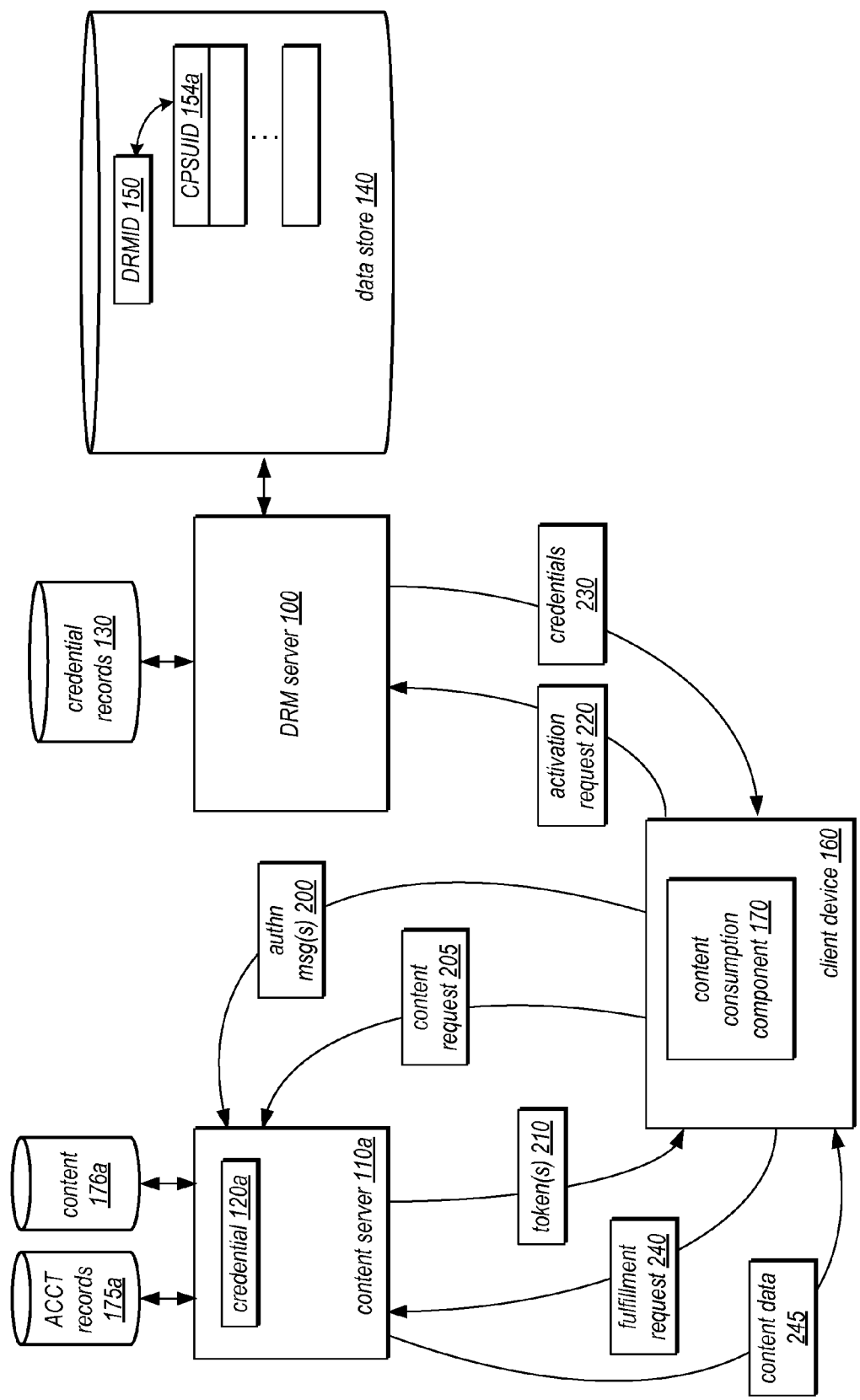
FIG. 2 illustrates a flow diagram of the activation of a client device by a DRM server as well as the acquisition of content by the client device, according to some embodiments.
Figure 9:
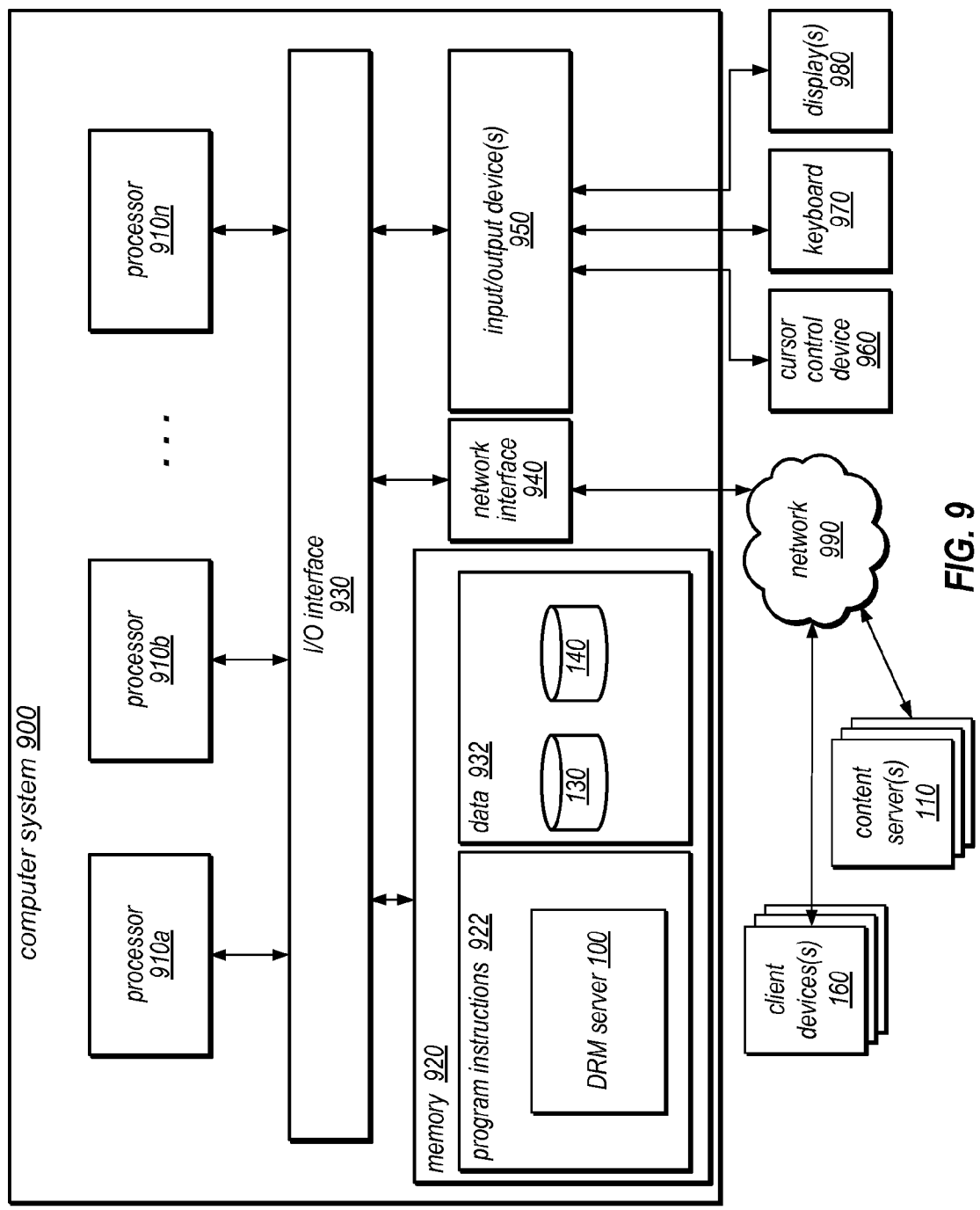
FIG. 9 illustrates an example computer system suitable for implementing various components of the system and method for transparently authenticating a user to a digital rights management entity, according to various embodiments.

FIG. 2 illustrates the process of initially activating a content consumption component on a client device for participation in the DRM framework described herein. In various embodiments, content may be consumed on one or more devices, such as client device 160. In various embodiments, client device 160 may be any electronic device configured to consume electronic content. In various embodiments, such a device may include but is not limited to a computer system (e.g., a desktop, laptop, handheld, or netbook computer), a digital audio or multimedia player (e.g., an MP3 player), a personal digital assistant (PDA), a mobile phone, a smartphone, a touch screen device, an e-book reader, a digital photo frame, a wristwatch, a digital camera, a set top box, a video game console, or any other electronic device or system configured to access, view, read, write, and/or manipulate any of the content data described herein. The computer system of FIG. 9 (described below) may be utilized to implement any of the aforesaid systems or devices in various embodiments.

In various embodiments, client device 160 may include a content consumption component 170, which may be implemented in hardware, software (e.g., processor-executable instructions) or some combination thereof. In various embodiments, content consumption component 170 may include a processor-executable application configured to access, render and/or present (e.g., via an electronic display) one or more e-books for viewing by a content consumer (e.g., a user operating client device 160). Specific examples of a content consumption component 170 include but are not limited to Adobe® Acrobat®, Adobe®Digital Editions, Adobe® Reader®, and Adobe® Reader® for mobile devices. In some embodiments, content consumption component 170 may be a plug-in or application extension to another executable application, such as a web browser or other application configured to browse a network (e.g., the Internet).

In various embodiments, the illustrated content consumption component and/or client device 160 may be configured to authenticate a content consumer (e.g., a user operating client device 160 or a user having access to client device 160) by exchanging one or more authentication messages 200 with content server 110a. Such messages may be sent from the client device via content consumption component 170 (e.g., content consumption component 170 might have a built in web browser component) or through another component of client device 160, such as a separate web browser (not illustrated). For example, client device 160 may be configured to send user-provided authentication information (e.g., username, password, security phrase, security codes, biometric information and/or other authentication information) to content server 110a as authentication messages 200. Based on such messages content server 110a may be configured to authenticate the user. For instance, the content server may access respective authentication information from one or more data stores and compare that authentication information to the authentication information provided by the client device. In various embodiments, account records data store 175a may include such authentication information (as well as other account-specific information) on a per-user basis. If the authentication information matches, the content server may determine that the user is authenticated. In response to such authentication, the content server may perform one or more other actions, such as logging the content consumer (e.g., the user of client device 160) into a customer account. Logging a content consumer into a customer account may include but is not limited to issuing one or more session tokens (commonly referred to as "cookies") to the client device. If the submitted authentication information does not match the authentication information on record, the content server may prevent the user from being authenticated or provide the user with another chance to authenticate via client device 160.

In various embodiments, client device 160 may also issue one or more content requests to the content server, such as content request 205. In various embodiments, content request 205 may be a request for a particular portion of content offered by the content server 110a, such as content stored in content data store 176a. In various embodiments, content request 205 may include but is not limited to a request to purchase, rent, lease, borrow, and/or access a particular portion of digital content. For instance, content server 110a may be owned or controlled by an e-commerce website and content request 205 may be a request to purchase content from such website. In another example, content server 110a may be owned or controlled by a public or private library and content request 205 may be a request to lease, loan, rent, or borrow a particular portion of electronic content from such library. In various embodiments, content request 205 may include information pertaining to a transaction such as payment information (e.g., bank or credit card numbers, etc.). In other cases, such information may already by on record with the content server and the payment information may simply indicate which payment account should be charged (if any). Also note that the embodiments described herein are presented within the context of a purchase, rental, or some other acquisition of content from the content server by the client device. However, note that in other embodiments such processes are not necessary; some or all of the interactions between the client device, content server, and/or DRM server may be limited to authentication related activities in some embodiments. In general, the activation process illustrated in FIG. 1 may include but need not include the acquisition of content by client device 160, according to various embodiments.

In various embodiments, content server may issue one or more tokens 210 to the content consumption component 170. In various embodiments, at least one token 210 is an authentication token. In various embodiments, the authentication token may include information that indicates content server 110a (or an entity that owns or controls the content server, such as a respective content provider) has authenticated the user (or otherwise attests to the identity of the user of client device 160). Such information may include an identifier for the content server (or an identifier of the respective content provider) as well as an identifier for the user, such as the user identifier that the user of client device 160 used to authenticate to the content server (e.g., a username or user ID associated with a user's account) or some other user identifier. In various embodiments, the user identifier indicated by the authentication token may be an identifier specific to that content server and/or a user identifier unique within the domain of customers that interact with content server 110. In various embodiments, one or more of the tokens may adhere to Security Assertion Markup Language (SAML).

In various embodiments, the authentication token may be digitally signed by the content server with the digital credential 120a issued during the establishment of the content provider-DRM provider trust relationship described above with respect to FIG. 1. For instance, in embodiments wherein the credential issued is a public key-private key pair, the content server may configured to digitally sign the authentication token by performing a cryptographic hash function on the authentication token to generate a digest. This digest may be encrypted with the private key of the credential and the encrypted digest may be the digital signature of the authentication token. This digital signature may be included with the authentication token, such as included within metadata (e.g., metadata stored in a header of the token).

In various embodiments, token(s) 210 may also include a fulfillment token which includes information for retrieving a particular portion of content (e.g., such as the content requested in request 205). For instance, the fulfillment token may include a network location of content or a transaction identifier of a transaction associated with such content. In general, the fulfillment token includes information that enables the content server to identify and/or locate a particular portion of content (e.g., upon receipt of such token, described in more detail with respect to fulfillment request 240).

In various embodiments, token(s) 210 may be stored or cached by content consumption 170 for later use, such as for communications with DRM server 100 and/or the content server, as described in more detail herein.

In the illustrated embodiment, content consumption component 170 may need to be activated with DRM server 100 (e.g., the device has never been activated or needs to be re-activated for any reason). In various embodiments, whether or not a component is activated for use in the DRM framework may be dependent on whether the component has been issued digital credentials for use in the DRM framework. In various embodiments, content consumption component 170 may be configured to determine whether such credentials have been provisioned to it. If the credentials have not been provisioned to it, the content consumption component may send an activation request 220 to DRM server 100. In various embodiments, content consumption component 170 may generate the activation request 220 such that the request includes the digitally signed authentication token provided by the content server and illustrated as one of token(s) 210. Note that in some embodiments, the submission of such request may occur without input or interaction from the user of client device 160. In various embodiments, such submission may be completely transparent or nearly transparent to the user.

In addition to the activation token, activation request 220 may also include information specifying one or more requested operations, according to various embodiments. In some embodiments, one of the requested operations may be a request to establish (e.g., create) a digital rights management account with the DRM server. In some cases, one of the requested operations may be a request for one or more credentials that the client device may use to operate within the DRM framework illustrated. In some embodiments, the above-described information may not be explicitly included within activation request 220; instead, DRM server 100 may infer which operations are requested based on the nature of the request. For instance, in some embodiments, content consumption component 170 may send request 220 to a particular service interface (e.g., an interface of a network-based service) of DRM server 100. In such cases, DRM server 100 may be configured to determine the operation(s) that are being requested based on the particular interface to which the request was directed.

In various embodiments, DRM server 100 may be configured to perform one or more operations in response to receiving activation request 220, including but not limited to generating a DRM account record associated with the user of client device 160, generating a mapping of the DRM account record to a record of the user account identifier for content server 110, generating a record of the device from which the activation request originated, verifying the digital signature of the authentication token within the activation request, issuing credentials to content consumption component 170 and issuing an identifier associated with the DRM account for the user to the content consumption component, as described in more detail below.

In various embodiments, DRM server 100 may be configured to verify the authenticity of the authentication token within activation request 220. In various embodiments, such verification may include verifying the digital signature of the digitally signed authentication token. In various embodiments, such verification may include verifying an authentication code of the authentication code (e.g., verifying a MAC). In various embodiments, verification of the digital signature may include identifying the content provider that signed such the authentication token. For instance, the DRM server may be configured to evaluate information of the authentication token to determine the identity of the content provider that signed the authentication token. In various embodiments, the DRM server may be configured to determine a credential previously issued to that content provider (in accordance with the techniques described above with respect to FIG. 1), such as by searching for and finding a credential mapped to that content provider in credential records data store 130. In various embodiments, DRM server 100 may be configured to use the credential to verify the digital signature of the authentication token. For instance, if the digital signature were signed by the content provider with a private key issued during the establishment of the trust relationship, DRM server 100 may be configured to verifying the digital signature with the corresponding public key. For instance, the DRM server might decrypt the digital signature using that public key and compare the result of that decryption with a cryptographic hash of the authentication token. If the comparison results in a match, the DRM server may determine that the digital signature is valid. If the comparison does not result in a match, the DRM server may determine that the digital signature is not valid (e.g., invalid).

As described above, the authentication token may include information that indicates content server 110a (or an entity that owns or controls the content server, such as a respective content provider) has authenticated the user (or otherwise attests to the identity of the user of client device 160 and/or content consumption component 170). In cases where the DRM server determines that the digital signature is valid, the DRM server may also determine that the information indicated by the authentication token is also valid (since the token was signed by an entity with which the DRM server previously established a trust relationship). In this way, the user of content consumption component 170 may be authenticated to the DRM server without the user directly providing user credentials (e.g., a username and password) to the DRM server. Moreover, in various embodiments, the sending of the content consumption component to the DRM server may be transparent to the user of client device 160.

The DRM server may perform various operations in response to successfully authenticating the user via the authentication token. One of such operations may include the creation of a DRM identifier for that user, as illustrated by DRMID 150. In some cases, the presence of this identifier within data store 140 may indicate that the user of the client device has established an account with the DRM server. In various embodiments, data store 140 may be configured as a database, as one or more mass storage devices (e.g., physical disks, logical volumes, etc.) configured to store data blocks or files, or in any other suitable configuration for data storage. In various embodiments, a given DRMID 150 may be unique within the domain of the entire DRM framework illustrated. In various embodiments, the DRMID 150 may be reported to the content server that signed the authentication token, such as content server 110a. This reporting may be performed by the DRM server or by the client device (such as when sending fulfillment request 240, described below). In response to receiving DRMID 150, content server 110a may map the DRMID 150 to the user's account record within account records data store 175a. The DRM identifier is described in more detail below.

In various embodiments, in response to authenticating the user via the authentication token, DRM server 100 may issue credentials 230 to content consumption component 170. Such credentials may be utilized by the content consumption for communicating with other elements within the DRM framework and/or cryptographic operations (e.g., encryption/decryption of content). In various embodiments, credentials 230 may include one or more shared secrets (e.g., symmetric keys) and/or one or more public key-private key pairs. In some embodiments, the DRM server may issue one public key-private key pair to the content consumption component for securely communicating with elements of the DRM framework (e.g., securely communicating with content servers or the DRM server) and another public key-private key pair for the encryption or decryption of content, such as the decryption of content received from one or more of content servers 110. DRM server 100 may store in credential records 130 one or more records that map user, machine, or content consumption component identifiers to the issued credentials (e.g., so DRM server may look up such credentials for later use, such as for verification of messages sent by the client device).

In various embodiments, credentials 230 may also include the user's DRMID 150, which may be cached by the content consumption component for later use. For instance, as described in more detail with respect to FIG. 3, the content consumption component may provide this DRMID 150 in subsequent authentication tokens sent to the DRM server such that the DRM server may map additional content provider accounts or identifiers to that DRMID.

In various embodiments, in response to authenticating the user via the authentication token, the DRM server may retrieve the user's identifier for content server 110a from the authentication token and map such information to the DRMID 150. Such information is illustrated as content provider specific user identifier (CPSUID 154a). In various embodiments, such identifier may specify both the user's identifier (for that content provider) as well as an identifier of the content provider itself. For instance, one example of a CPSUID might be "JohnSmith@PublicLibrary" where "JohnSmith" is the user identifier that the user uses to authenticate with the content provider "PublicLibrary." In various embodiments, other types of identifiers are possible and contemplated. As described in more detail below with respect to FIG. 3, DRMID 150 may be associated with multiple ones of the user's content provider accounts.

Fulfillment

In various embodiments, once the content consumption component 170 receives credentials 230, the content consumption component may be activated. An activated content consumption component may have the necessary credentials (e.g., credentials 230) to communicate securely with other entities in the DRM system (e.g., the DRM server or one or more content providers operating respective content servers) as well as receive encrypted content from such entities (e.g., purchased or rented content). Subsequent to being activated, the content consumption component may submit a fulfillment request 240 to content server 110a. For instance, such request may be a request to fulfill a transaction established during content request 205, such as a transaction for the purchase or rental of an e-book. In various embodiments, fulfillment request 240 may include the fulfillment token received by the content consumption component and described above with respect to token(s) 210. In various embodiments, such a fulfillment token may specify the particular content to be retrieved and/or the location from which such content is to be retrieved. In various embodiments, the fulfillment request generated by the content consumption component may include one or more credentials from credentials 230. For instance, in some embodiments, the fulfillment request 240 may include a public key corresponding to a private key held by the content consumption component. In some cases, the public key of the fulfillment request may be part of a digital certificate (signed by a trusted third party, such as the DRM server or a certificate authority) that the content consumption component includes within request 240. In various embodiments, the fulfillment request may include the DRMID 150 that was established for the user of client device 160. In some cases, this could be part of metadata of the fulfillment request. In some cases, such identifier may be indicated by the digital certificate described above. The content provider may add an association or mapping of the DRMID to the user account record within account records 175a.

In response to fulfillment request 240, content server may lookup the request content in a content data store 176a. In various embodiments, the content server may encrypt the content with an encryption key, such as a symmetric key, or the content may already be encrypted and the content server may retrieve the content encryption key (CEK) from content data store 176a. The content server may then encrypt the CEK with the public key of the certificate provided as part of the fulfillment request (note that the content consumption component may hold the corresponding private key). The encrypted CEK may be stored within a content license of the encrypted content. To fulfill request 240, content server 110a may then provide the content and the corresponding license to the content consumption component, as illustrated by content data 245. Content consumption component 170 may be configured to decrypt the encrypted CEK with a private key from credentials 230 (e.g., a private key corresponding to the public key provided to the content server as part of a digital certificate for the content consumption component). The content consumption component may then decrypt the encrypted content with the decrypted CEK. In various embodiments, the content consumption component may consume (e.g., present, display, render, etc.) at least some of the decrypted content. In various embodiments, consumed content may be viewed by a user of content device 160. For instance, such user may view pages of an e-book on an electronic display of client device 160 or coupled to client device 160.

Note that as a result of the operations of the DRM system as illustrated in FIG. 2, the user of content consumption component 170 may now have a DRM account established with the DRM server. The DRM server may also store a mapping of this DRM account to the user's identifier for content server 110a. Similarly content server may store a record of the user's account in account records 175a as well as a mapping of the user's DRM account identifier (e.g., DRMID 150) to his account in account records 175a. In this way, both the user's DRM account and the user account with content server 110a may be cross-referenced by either of the content server and the DRM server if given either one of the DRM account identifier (e.g., DRMID 150) or the content provider specific user identifier (e.g., CPSUID 154a).

Acquisition of Content from a New Content Provider

Figure 3:
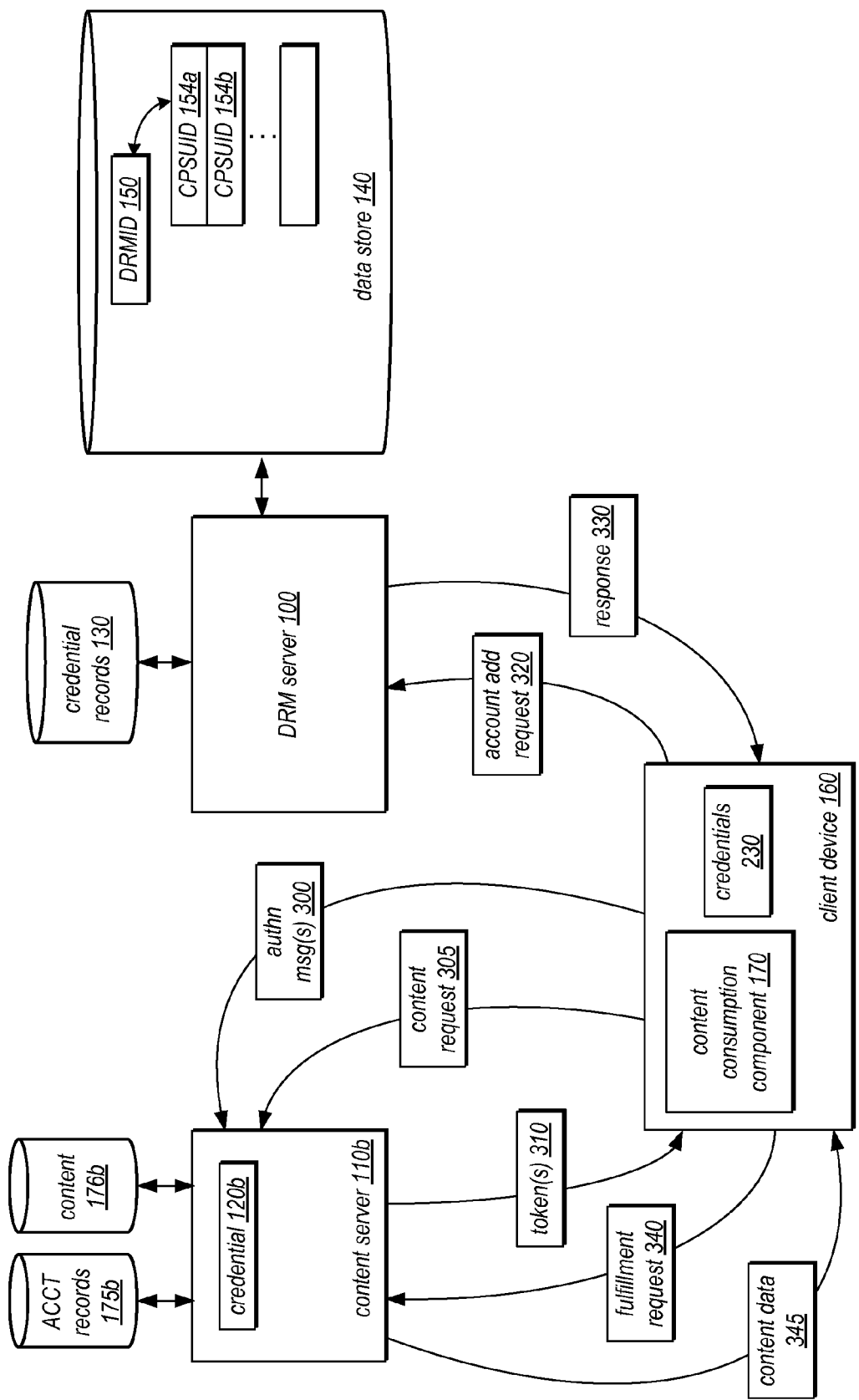
FIG. 3 illustrates a flow diagram of an activated client device acquiring content from a newly-accessed content server, according to some embodiments.

FIG. 3 illustrates the acquisition of content from a new content provider, such as the content provider associated with content server 110b. In the illustrated embodiment, the state in which the DRM system resides may be some instance subsequent to the activation described above with respect to FIG. 2. For instance, in the illustrated embodiment, the presence of credentials 230 on client device 160 indicate content consumption component 170 has been activated by DRM server 100. Also note that account records data store 175b and content data store 176b may be configured in a manner similar to that of account records data store 175a and content data store 176a described above.

In the illustrated embodiment, the user of client device 160 may be authenticated to content server 110b, as illustrated by authentication messages 300, in a manner similar to that described above with respect to authentication messages 200 of FIG. 2. Likewise, content request 305 may be similar to the request described above with respect to content request 205 of FIG. 2. The acquisition of token(s) 310 may also be performed in a manner similar to that described above with respect to token(s) 210 of FIG. 2. The content of token(s) 310 may also be similar to token(s) 210 of FIG. 2. For instance, token(s) 310 may include but are not limited to an authentication token and a fulfillment token. Such tokens may be digitally signed with credential 120b.

In the illustrated embodiment, upon receipt of the token(s) 310, content consumption component 170 may perform somewhat differently than described with respect to FIG. 2. For instance, since the content consumption component has already been activated as illustrated by the presence of credentials 230, the content consumption component may send a different type of request to the DRM server. Such request is illustrated as an account addition request 320. In various embodiments request 320 may be digitally signed with credentials 230 such that DRM server 100 can verify the authenticity of the request. The account addition request may include an authentication token signed by content server 110b (similar to the authentication token described above with respect to FIG. 2). In various embodiments, the content consumption component may generate the authentication token such that the authentication token also includes DRMID 150 (which was previously cached by the content consumption component, as illustrated by the presence of credentials 230 on the client device). In this way, DRM server will be able link the account of the new content provider to the user's DRM account, as described in more detail below.

In some embodiments, the DRM server may respond to such a request by linking the user's account with the new content provider (e.g., content server 110b) to the already established DRMID for the user (e.g., DRMID 150). In various embodiments, the DRMID of the user (e.g., DRMID 150) may be embedded within the account addition request by the content consumption component; the DRM server may be configured to use the DRMDID to lookup the user's DRM account (such as for account linking purposes). In the illustrated embodiment, the linking of the user's account with the new content provider (e.g., content server 110*b*) to the already established DRMID for the user (e.g., DRMID 150) is illustrated by the mapping of DRMID 150 to CPSUID 154*b* (e.g. the user's content specific user ID for that new content provider). Additionally, the DRM server may refrain from issuing credentials in this case (since credentials were already issued in the processing of the prior activation request).

As illustrated by response 330, the DRM server 100 may send a response to content consumption component to indicate whether the account addition (e.g., the linking of the user's account with the new content provider to his DRM account) was a success or failure. Generally this operation will be a success and the content consumption component may proceed with fulfillment of content acquisition. In some cases, the account addition may fail, such as if the account addition request 320 included the wrong DRMID for the user (as might be the case if the user were operating a friend's device).

In response to a successful account addition or account linking as indicated by response 330, the content consumption component may proceed with the acquisition of content as illustrated by the providing of fulfillment request 340 to content server 110*b* and the receipt of content data 345 by the content consumption device. Request 340 and content data 345 may be similar to request 240 and content data 245, as described above with respect to FIG. 2.

Acquisition of Content on a New Client Device

Figure 4:
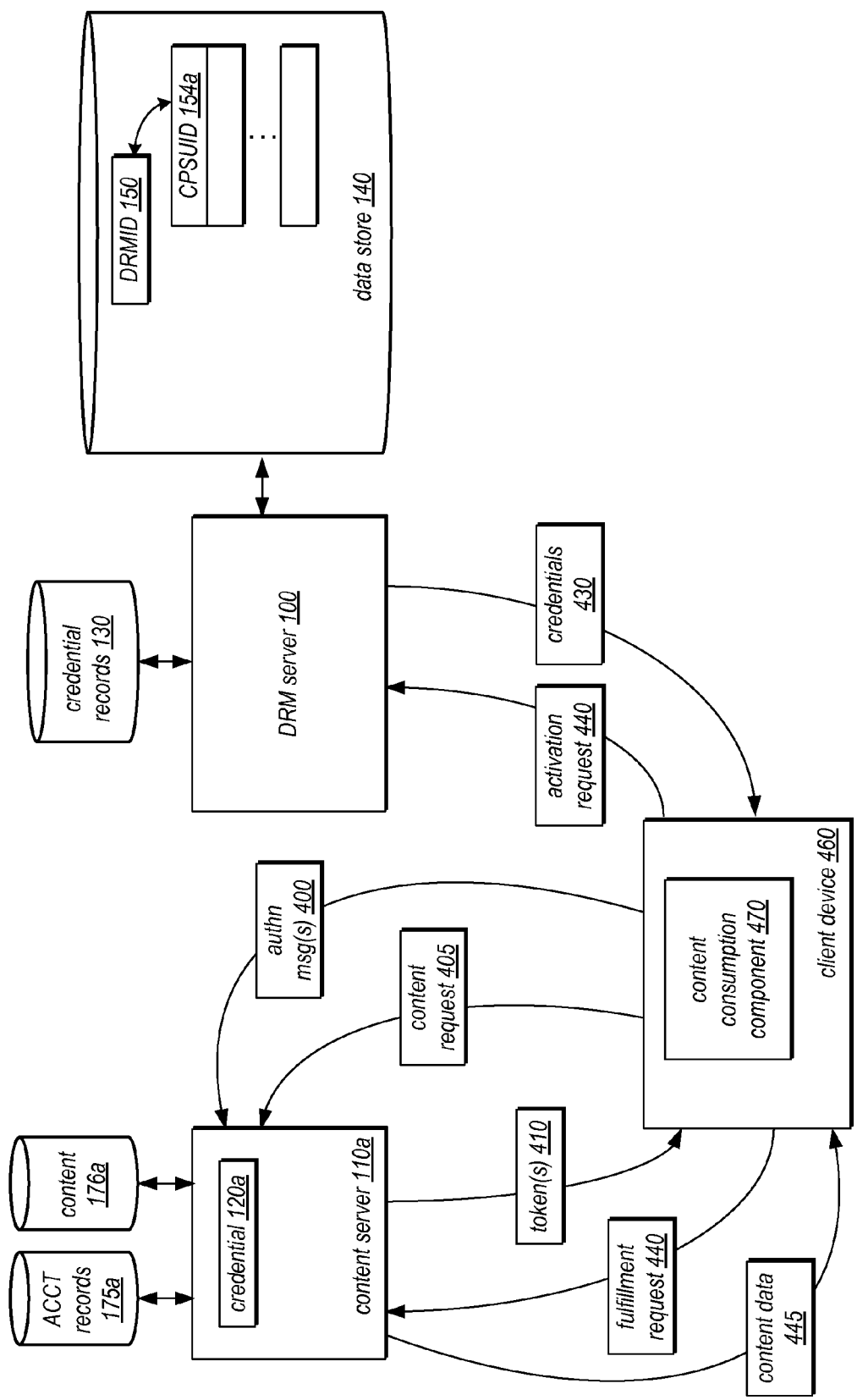
FIG. 4 illustrates a flow diagram of the activation of a given user's second client device as well as the acquisition of content with such device, according to some embodiments.

FIG. 4 illustrates the acquisition of new content by the same user described above on a new client device (e.g., client device 460) including a new content consumption component (content consumption component 470). In the illustrated embodiment, the content provider is the same as illustrated above with respect to FIG. 2 (e.g., content server 110*a*). In the illustrated embodiment, the state in which the DRM system resides may be some instance subsequent to the activation described above with respect to FIG. 2. For instance, in the illustrated embodiment, content server 110*a* may already have a record of the user's DRMID 150 mapped to the user's account record in account records data store 175*a*.

In the illustrated embodiment, the user of client device 460 may be authenticated to content server 110*a*, as illustrated by authentication messages 400, in a manner similar to that described above with respect to authentication messages 200 of FIG. 2. Likewise, content request 405 may be similar to the request described above with respect to content request 205 of FIG. 2. The acquisition of token(s) 310 may also be performed in a manner similar to that described above with respect to token(s) 210 of FIG. 2. Such tokens may be digitally signed with credential 120*a*. The content of token(s) 310 may also be similar to token(s) 210 of FIG. 2. For instance, token(s) 310 may include but are not limited to an authentication token and a fulfillment token. In the illustrated embodiment, the authentication token may also include the users DRMID 150 (since this may have been determined by the content server, as described above with respect to FIG. 2).

In the illustrated embodiment, content consumption 470 may submit an activation request 440 that includes the authentication token, similar to the request 240 described above with respect to FIG. 2. In this case, the authentication token may additionally include the user's DRM account identifier (DRMID 150), which may be embedded into the token by content server 110*a* (since the DRMID 150 may have been previously determined by the content server, as described above with respect to FIG. 2). After verifying the authentication token (in a manner similar to that described above with respect to FIG. 2), DRM server may respond to activation request 440 by providing credentials 430 (similar to credentials 230 described above) to the client device, at which point the client device may be activated. Note that in the illustrated embodiment, unlike the processing of activation request in FIG. 2, the DRM server may refrain from creating a record of a new DRM account (since a record of such account was previously created).

Subsequent to receiving credentials 430, the content consumption component 470 may proceed with the acquisition of content as illustrated by the providing of fulfillment request 340 to content server 110*b* and the receipt of content data 345 by the content consumption device. Request 340 and content data 345 may be similar to request 240 and content data 245, as described above with respect to FIG. 2.

Transferring Content Between Devices

Figure 5:
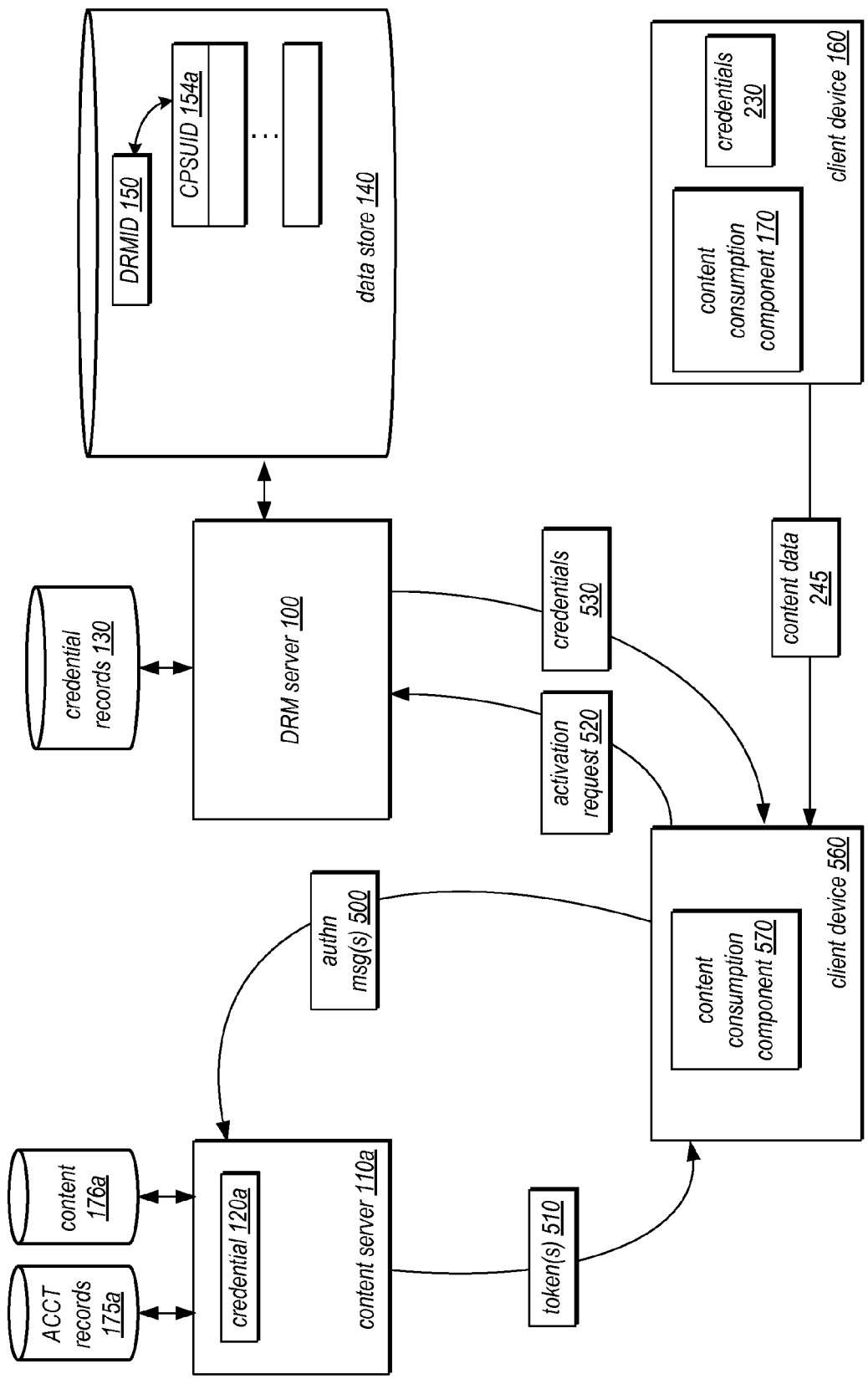
FIG. 5 illustrates a flow diagram of a content transfer and subsequent device activation, according to some embodiments.

FIG. 5 illustrates operation of the DRM system subsequent to the transfer of previously obtained content (e.g., content 245, described above) from an activated content consumption component (e.g., content consumption component 170 of client device 160) to a new content consumption component (e.g., content consumption component 570 of client device 560). Note that the content server 110 is the same as described above with respect to FIG. 2. In the illustrated embodiment, the state in which the DRM system resides may be some instance subsequent to the activation described above with respect to FIG. 2. In the illustrated embodiment, because content consumption component may not be activated upon receiving content data 245 (e.g., does not have the requisite credentials), the content consumption component may not be able decrypt the received content. Content consumption component may obtain the appropriate credentials as follows.

As described above with respect to FIG. 2, content data 245 may include content encrypted with a CEK as well as a content license that includes an encrypted version of the CEK. Such encrypted CEK may be encrypted with a public key of credentials 230. Upon receiving content data 245, content consumption component 570 may not have possession of the requisite credentials (e.g., the private key corresponding to the aforesaid public key) to decrypt the CEK in order to decrypt the content (e.g., because content consumption component 570 has not yet been activated. In various embodiments, content data 245 may include an identifier or network location of the content provider that issued the content license for that content. For instance, when content server 110*a* created content data 245 as illustrated in FIG. 2, the content server 110*a* may have embedded an identifier or network location pointing back to the content server. For instance, such information may have been embedded within content data 245 as metadata. Content consumption component may be configured to access the aforesaid information from content data 245 to determine the particular content provider to contact for obtaining an authentication token, which will ultimately allow the content consumption component to obtain the requisite credentials for content decryption, as described in more detail below.

In various embodiments, content consumption component 570 may prompt the user of client device 560 (which may be the same user associated with client device 160) to perform authentication with the content provider indicated by the content data. For instance, content consumption component 570 may generate a dialog box or initiate a web browser (or other network-based browser) session. In response, authentication may be performed in a similar manner to that described as described above with respect to FIG. 2. For instance, authentication message(s) 500 may be similar to or the same as authentication messages 200 described above. In some embodiments, the authentication messages may also include a request for an authentication token. In some cases, this request may include a content identifier that identifies the content of content data 245 such that, e.g., content server 110*a* may verify that the user has purchased the content before. In response to the positive authentication of the user (and/or verification of the user's previous purchase of the content), content server 110*a* may issue token(s) 510, which may include an authentication token similar to those described above. Such tokens may be digitally signed with credential 120*a*. This authentication token may also include DRMID 150 as previously stored in account records data store 175*a*. Subsequent to receipt of the authentication token, content consumption component 570 may submit such authentication token to the DRM server, as illustrated by activation request 520, which may be similar to activation request 220 described above. In this case, the authentication token of the activation request may specify the DRMID 150 to the DRM server. In this way, the DRM server may verify the authenticity of the activation (using techniques similar to those described above, such as digital signature verification) and issue credentials associated with that DRMID to the client device, as illustrated by credentials 530 (which may in various embodiments be the same as credentials 230). In various embodiments, content consumption component 570 may utilize such credentials to decrypt content of content data 245. For instance, the content consumption component may access a private key of such credentials, decrypt the encrypted CEK of the content with the private key, and decrypt the content with the CEK.

Acquisition of New Content on a New Device by Previous DRM User

Figure 6:
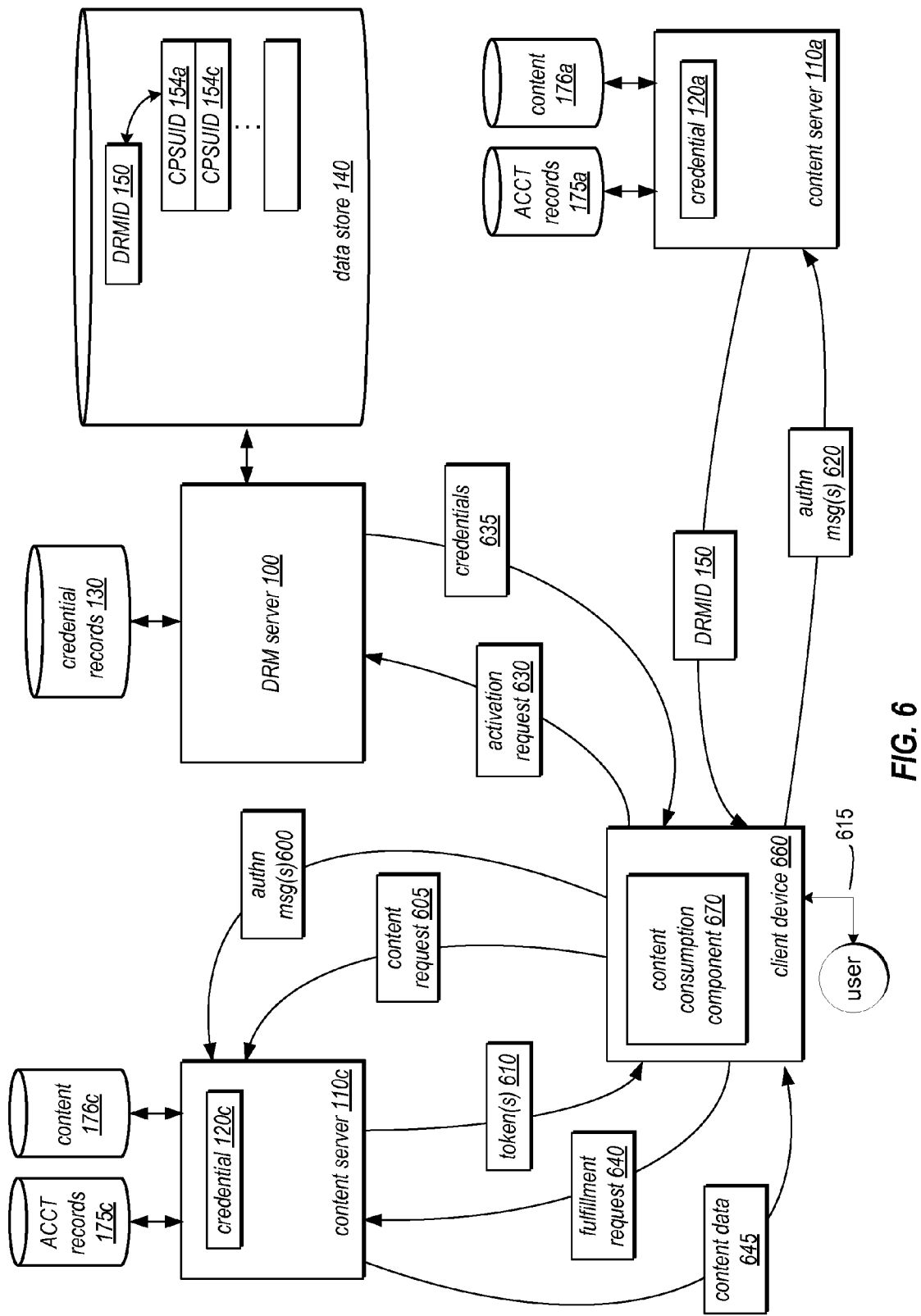
FIG. 6 illustrates a flow diagram of the initial acquisition of content from a new content server on a new client device, according to some embodiments.

In FIG. 6, a user that has already accessed content from a first content provider on one device may attempt to obtain different content from a different content provider on a new device (e.g., a device that has not yet been activated). As described below, various embodiments may enable the activation of the new device based on information provided from first content provider. In various embodiments, such an a configuration may prevent the same user from creating multiple DRM accounts with the DRM server, as described in more detail below. In the illustrated embodiment, the state in which the DRM system resides may be some instance subsequent to the activation described above with respect to FIG. 2.

In the illustrated embodiment, the user that previously used client device 160 (FIG. 2) may now attempt to use a device that has yet to be activated in order to obtain content from a new content provider (e.g., content server 110*c*), as illustrated by client device 660. In the illustrated embodiment, the authentication user's authentication with the new content server (e.g., authentication messages 600) may be similar to that described above with respect to previous Figures. Likewise, content request 605 may be similar to the content requests described above. In response, content server 110*c* may be configured to issue token(s) 610, which may include an authentication token and fulfillment token similar to those described above.

In the illustrated embodiment, instead of issuing an activation request at to the DRM server at this point (as is the case in FIG. 2), content consumption component 670 may present a list of trusted content providers and ask the user if they hold an account with any of such providers. This list may be obtained from DRM server 100 and may include any of the trusted content providers of FIG. 1. In the illustrated embodiment, such list may include the content provider corresponding to content server 110*a* and the user may select such content provider (since the user previously used this content provider in the illustrated embodiment of FIG. 2). Based on the user's response, the content consumption component may direct the user to authenticate with that content provider, such as by calling a web browser to display the authentication web page for the content provider. The interaction between the user and the client device, which is illustrated at 615, may be performed via the content consumption component, another application (e.g., a web browser) or some combination thereof. The user may authenticate with the selected content provider (e.g., the content provider previously used for content acquisition) as illustrated by authentication messages 620. In response to a successful authentication, content server 110*a* may return the previously established DRMID 150 (which was obtained by content server 110 as described above with respect to FIG. 2) to the client device. The client device may submit this DRMID 150 and the authentication token received from content server 110*c* to the DRM server as an activation request, such as the illustrated activation request 630. Because this activation requests specifies a previously establish DRMID (unlike the request of FIG. 2), the DRM server may link the user's identifier for content server 110*c* (illustrated as CPSUID 154*c*) to the previously established DRMID 150, as illustrated by the mapping between DRMID 150 and CPSUID 154*c* in data store 140. The presence of the DRMID within activation request 630 as well as DRM server 100's recognition of such DRMID may in various embodiments prevent the creation of multiple DRMIDs for a given user. In various embodiments, preventing multiple DRMIDs from being established for the same user may ensure that the user has the appropriate credentials on each of his devices for decrypting content. If a given user were to somehow establish multiple DRM accounts, content acquired under one account may not be able to be decrypted with content acquired under another account (since such accounts have different credentials).

In response to verifying the authenticity of DRMID 150 and the authentication token (which may be digitally signed by content server 110*a* and content server 110*c*, respectively), the DRM server may issue credentials 635 to the client device. In various embodiments, such credentials may be similar to or the same as credentials 230 described above. Content consumption component 670 may submit a fulfillment request 640 (similar to fulfillment request 240 described above) and receive content data 645 in response (similar to content data 245 described above) to the request. The content consumption component may be configured to use the newly acquired credentials to decrypt and consume the content data.

Example Methods

The system and method for transparently authenticating a user to a digital rights management entity may include various methods, examples of which are described below. In various embodiments, such methods may be performed by the computer system of FIG. 9.

FIG. 7 illustrates a flowchart of an example method for processing an authentication token and issuing credentials based on verification of the token. In various embodiments, the illustrated method may be performed by DRM server 100 described above. As illustrated by block 702, the method may include receiving an authentication token from a first remote computer system; the authentication token may indicate that a particular user of the first remote computer system was authenticated by a first content provider of one or more content providers. In various embodiments, the authentication token may be digitally signed with a digital signature or may include an authentication code, such as a Message Authentication Code (MAC). One example of such a token includes the authentication token embedded within activation request 220 described above. In general, such an authentication token may include any of the authentication tokens described above. In various embodiments, each of the aforesaid content providers was previously issued a respective digital credential (e.g., including but not limited to authentication information for generating a MAC or a digital signature) in order to establish that they are trusted to authenticate a user on behalf of another entity (e.g., a DRM server). As illustrated by block 704, the method may also include verifying the authentication token, which may include determining that one or more portions of the authentication token were generated based on authentication information (e.g., digital credentials, keys for generating MACs, etc.) provisioned during the establishment of a the trust relationships. In some embodiments, this may include determining that a digital signature of the authentication token was generated based on a respective digital credential issued to the first content provider. In some embodiments, this may include determining that an authentication code (e.g., a MAC) of the authentication was generated based on authentication information provisioned during the establishment of a trust relationship, as described above. For instance, as described above, the DRM server may store records of digital credentials or other authentication information corresponding to trust relationships with various content providers. In various embodiments, the method may include accessing such records to locate a DRM credential issued to the first content provider as well as verifying the digital signature with such credential (e.g., a cryptographic hash-based authentication). As illustrated by block 706, the method may also include, in response to verification of the authentication token, issuing to the first remote computer system one or more credentials. In various embodiments, such credentials may be used for communication with one or more content providers or DRM providers and/or decryption of content received from the one or more content providers. For instance, examples of such credentials are described above with respect to credentials 230.

FIG. 8 illustrates a flowchart of an example method for processing an authentication token and activating a client device. In various embodiments, the illustrated method may be performed by any of the client devices or content consumption components described above. As illustrated by block 802, the method may include receiving an authentication token from a first content provider of one or more content providers; such authentication token may indicate that a particular user was authenticated by the first content provider. For instance, one example of the receipt of such a token is illustrated by the receipt of token(s) 210 described above. In various embodiments, each of the aforesaid content providers was previously issued a respective digital credential in order to establish that they are trusted to authenticate a user on behalf of another entity (e.g., a DRM server), such as described above with respect to FIG. 1. As illustrated by block 804, the method may also include providing the authentication token to a digital rights management provider. For instance, one example of providing an authentication token to a digital rights management provider is illustrated by submitting such authentication token as part of an activation request, such activation request 220 described above. As illustrated by block 806, the method may also include, subsequent to the digital rights management provider verifying the authentication token, receiving from the digital rights management provider one or more credentials. In various embodiments, such credentials may be used for communication with one or more content providers and/or decryption of content received from the one or more content providers or DRM providers. For instance, examples of such credentials are described above with respect to credentials 230.

Example Computer System

Various embodiments of a system and method for transparently authenticating a user to a digital rights management entity, as described herein, may be executed on one or more computer systems, which may interact with various other devices. One such computer system is computer system 900 illustrated by FIG. 9, which may in various embodiments implement any of the elements or functionality illustrated in FIGS. 1-8. In various embodiments, computer system 900 may be configured to implement DRM server 100 described above. While the illustrated system demonstrates computer system 900 implementing the elements of DRM server 100, computer system 900 may be used to implement any other system, device, element, functionality or method of the above-described embodiments. In the illustrated embodiments, computer system 900 may be configured to implement DRM server 100 as processor-executable executable program instructions 922 (e.g., program instructions executable by processor(s) 910) in various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include data stores 130 and 140 configured as described above. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more client system(s) configured similarly to client device 160 or one or more content servers 110, or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the method illustrated by the flowchart of FIGS. 7-8. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. In general, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method comprising: issuing a first credential from a digital rights management provider to a content provider, the first credential indicating that the content provider is trusted by the digital rights management provider to generate an authentication token relating to content that is to be distributed by the content provider;

receiving, by the digital rights management provider from a remote computer system, an activation request that includes the authentication token generated by the content provider, wherein the authentication token has been (a) digitally signed by the content provider using the first credential and (b) sent to the remote computer system when the remote computer system accesses the content provider for its content; verifying, by the digital rights management provider, the authentication token by determining that the authentication token was at least partially generated based on the first credential issued to the content provider to confirm that the content provider is authorized by the digital rights management provider to distribute the content; and in response to verifying the authentication token, issuing, by the digital rights management provider, to the remote computer system one or more user credentials for performing one or more of: communication with the content provider or decryption of the content that is distributed by the content provider.

2. The computer-implemented method of claim 1, further comprising, in response to verifying the authentication token, generating, by the digital rights management provider, a stored identifier of a digital rights management account associated with a user of the remote computer system.

3. The computer-implemented method of claim 1, wherein: the authentication token indicates a user identifier identifying a user of the remote computer system; and
the method further comprises generating, by the digital rights management provider, (a) a stored identifier of a digital rights management account associated with the user, and (b) a stored mapping of the digital rights management account to the user identifier.

4. The computer-implemented method of claim 1, wherein the method further comprises: issuing a second credential from the digital rights management provider to a second content provider, the second credential indicating that the second content provider is trusted by the digital rights management provider to generate a second authentication token relating to content that is to be distributed by the second content provider;
receiving, by the digital rights management provider, a second activation request that includes the second authentication token generated by the second content provider, wherein the second authentication token has been (a) digitally signed by the second content provider using the second credential and (b) sent to the remote computer system when the remote computer system accesses the second content provider for its content;
verifying, by the digital rights management provider, the second authentication token by determining that the second authentication token was at least partially generated based on the second credential issued to the second content provider to confirm that the second content provider is authorized by the digital rights management provider to distribute content; and
in response to verifying the second authentication token, issuing, by the digital rights management provider, to the remote computer system one or more user credentials for performing one or more of: communication with the second content provider or decryption of the content received from the second content provider.

5. The computer-implemented method of claim 1, further comprising receiving, by the digital rights management provider, a message indicating an identifier of a digital rights management account associated with a user of the remote computer system, wherein the one or more user credentials are issued in response to verification of (a) the authentication token and (b) the identifier of the digital rights management account.

6. A system comprising a digital rights management provider that comprises:
a memory; and
one or more processors coupled to the memory, wherein the memory comprises program instructions executable by the one or more processors to:
issue a first credential from the digital rights management provider to a content provider, the first credential indicating that the content provider is trusted by the digital rights management provider to generate an authentication token relating to content that is to be distributed by the content provider;
receive an activation request from a remote computer system in regard to the content, wherein the activation request includes the authentication token generated by the content provider, and wherein the authentication token has been (a) digitally signed by the content provider
using the first credential and (b) sent to the remote computer system when the remote computer system accesses the content provider for its content;
verify the authentication token by determining that the authentication token was at least partially generated based on the first credential issued to the content provider to confirm that the content provider is authorized by the digital rights management provider to distribute content; and
in response to verifying the authentication token, issue, to the remote computer system one or more user credentials for performing one or more of: communication with the content provider or decryption of the content that is distributed by the content provider.

7. The system of claim 6, wherein the program instructions are further executable by the one or more processors to, in response to verifying the authentication token, generate a stored identifier of a digital rights management account associated with a user of the remote computer system.

8. The system of claim 6, wherein: the authentication token indicates a user identifier identifying a user of the remote computer system; and
the program instructions are further executable by the one or more processors to generate (a) a stored identifier of a digital rights management account associated with the user, and (b) a stored mapping of the digital rights management account to the user identifier.

9. The system of claim 6, wherein the program instructions are further executable by the one or more processors to: issue a second credential from the digital rights management provider to a second content provider, the second credential indicating that the second content provider is trusted by the digital rights management provider to generate a second authentication token relating to content that is to be distributed by the second content provider;
receive a second activation request from the remote computer system in regard to the content that is to be distributed by the second content provider, wherein the activation request includes the second authentication token generated by the second content provider, and wherein the second authentication token has been (a) digitally signed by the second content provider using the second credential and (b) sent to the remote computer system when the remote computer system accesses the second content provider for its content;
verify the second authentication token by determining that the second authentication token was at least partially generated based on the second credential issued to the second content provider to confirm that the second content provider is authorized by the digital rights management provider to distribute content; and in response to verifying the second authentication token, issue, to the remote computer system one or more user credentials for performing one or more of: communication with the second content provider or decryption of content received from the second content provider.

10. The system of claim 6, wherein:

the program instructions are further executable by the one or more processors to receive a message indicating an identifier of a digital rights management account associated with a user of the remote computer system; and the one or more user credentials are issued in response to verification of (a) the authentication token and (b) the identifier of the digital rights management account.

* * * * *